Feb. 27, 1945. W. F. ALLER 2,370,219
GAUGING DEVICE
Filed Aug. 15, 1942 2 Sheets-Sheet 2
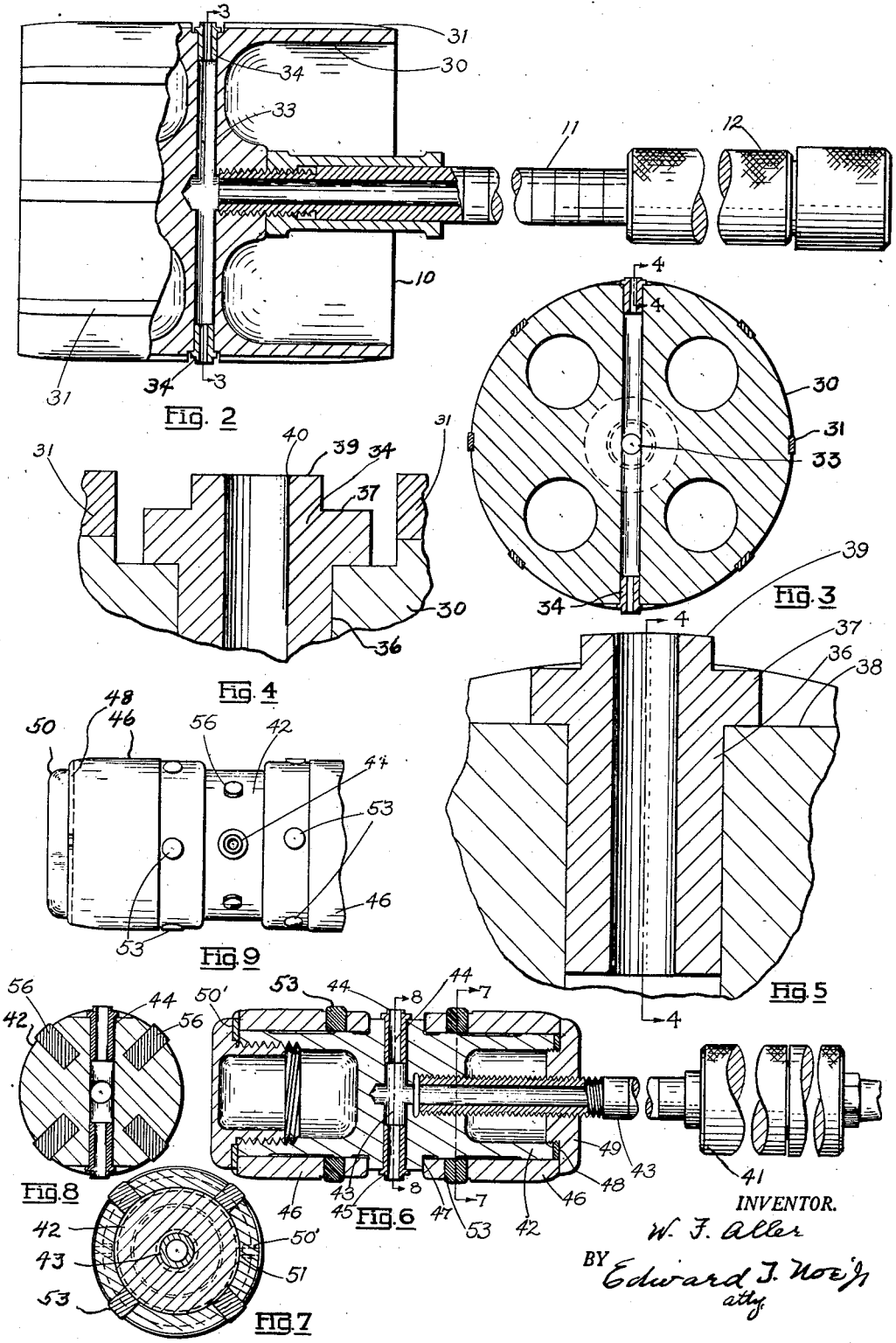

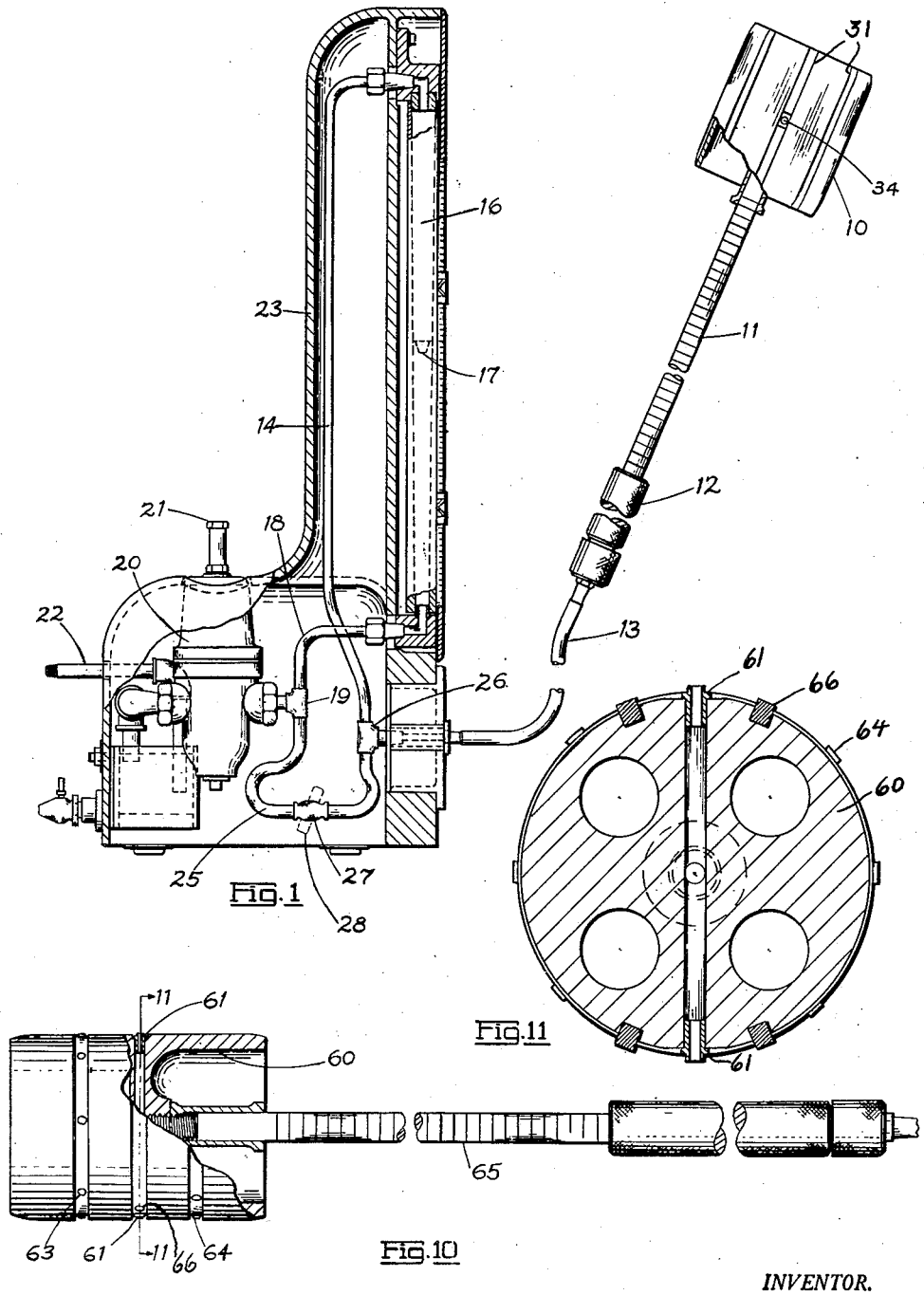

Patented Feb. 27, 1945

2,370,219

UNITED STATES PATENT OFFICE 2,370,219

GAUGING DEVICE

Willis Fay Aller, Dayton, Ohio, assignor to The Sheffield Corporation, Dayton, Ohio, a corporation of Ohio Application August 15, 1942, Serial No. 454,921

14 Claims. (Cl. 33—178)

This invention relates to gauging devices for determining or comparing a diametrical or other dimension of a workpiece.

One object of the invention is the provision of a gauging device employing fluid flow through a leakage path between the workpiece and a gauging element to determine a dimension of the workpiece, the gauging element being so constructed and arranged as to eliminate wear of the parts over very extended periods of use, and providing for very accurate gauging measurements.

Another object of the invention is the provision of a gauging device embodying a gauging element having one or more nozzle inserts, the gauging surface or surfaces of which are held in spaced relation with respect to the surface of a workpiece gauged thereby and are protected from injury in handling.

Another object is the provision of a gauging device embodying a gauging element adapted for cooperating with a workpiece to be gauged to provide a fluid leakage path that is variable in size in accordance with the fit of the workpiece, the gauging element having a gauging nozzle or nozzles held in spaced relation from the workpiece surface by inserts of carboloy or the like which insure the presence of some spacing between the end of the nozzle and the workpiece surface.

Another object is the provision of a gauging device embodying a gauging element adapted for interfitting association with a workpiece to provide a fluid leakage path that is variable in size in accordance with the fit of the workpiece, the gauging element having one or more gauging nozzles through which a leakage flow of air or other fluid takes place in the gauging operation, and having an annular series of hardened work engaging members arranged for rotation about the axis of the gauging element so that the hardened members mount the gauging element axis in central alignment with the axis of the workpiece in measuring a rifling groove or the like.

Another object is the provision of a gauging device embodying a gauging element adapted for cooperation with a workpiece to be gauged to provide a fluid leakage path that is variable in size in accordance with the fit of the workpiece, together with means for gauging the rate of flow of fluid through the leakage path and a variable by-pass conduit connected across opposite sides of the flow gauging means by which the rate of flow of fluid through the by-pass can be controlled so that the range of measurements produced by the flow gauging means is susceptible of wide adjustment.

Other objects and advantages of the invention will be apparent from the following description, the appended claims, and the accompanying drawings, in which:

Fig. 1 is a side elevation of a gauging device embodying the present invention, certain of the parts being shown in vertical section;

Fig. 2 is a side elevation of a gauging element partly in vertical section, and shown connected to the handle portion of the gauging device;

Fig. 3 is a vertical section on the line 3—3 of Fig. 2;

Fig. 4 is a section, on an enlarged scale, taken on the line 4—4 of Fig. 3;

Fig. 5 is a section, on an enlarged scale, taken in the same plane as the section of Fig. 3;

Fig. 6 is a central vertical section through a modified form of gauging element, adapted for measuring or comparing a diametrical measurement of a rifled barrel;

Fig. 7 is a transverse section on the line 7—7 of Fig. 6;

Fig. 8 is a section on the line 8—8 of Fig. 6;

Fig. 9 is a side elevation of a portion of the gauging element shown in Fig. 6;

Fig. 10 is a side elevation, shown partly in section, of another modification of the gauging element; and Fig. 11 is a transverse section on the line 11—11 of Fig. 10.

In the drawings, in which the same reference numerals have been used to designate like parts in the several views, certain preferred embodiments of the invention have been illustrated. Referring more particularly to Figs 1 to 3 of the drawings, the gauging device comprises a gauging element 10 which is adapted for interfitting association with a workpiece surface to be gauged. While this gauging element may be either a male or female part, as herein shown it is adapted to enter the workpiece to be gauged to obtain a diametrical measurement or comparison with a part of known dimensions. One or more leakage passages or orifices are provided in this gauging element so that a flow of air or other fluid can take place between the gauging element and the workpiece surface, and the size of the leakage path determines the rate of flow of fluid from a suitable fluid pressure source.

Pressure fluid is supplied to the gauging element 10 by means of a hollow, rigid pipe 11 on which the gauging element 10 is held. A shut-off valve 12 governs the flow of air to the pipe 11 from a flexible tube 13 which communicates with a conduit 14. This conduit is in free communication with a device for measuring the rate of flow of fluid therethrough. Preferably this measuring device comprises a transparent upright tube 16 having a passage which gradually tapers in cross-sectional area from a minimum diameter at its lower end to a maximum diameter at its upper end. Within the tube is a light gauge or float 17 the diameter of which is just slightly smaller than the diameter of the passage at the lower end of the tube 16. As fluid flows upwardly through the tube 16 it displaces the float 17 to some position above the bottom of the tube until the flow of fluid around the outside of the float takes place fast enough so that the float remains stationary on the moving body of fluid, its position above the bottom of the tube giving an indication of the rate of flow of fluid through the tube independent of the particular pressure prevailing at the supply end of the tube.

The lower end of the tube 16 is connected by means of a pipe 18 to a T connection 19 by means of which it is placed in free communication with the discharge end of a pressure regulating valve 20 having a suitable adjusting screw 21 which permits adjustment of the fluid pressure at the discharge end. Compressed air or other fluid is supplied to the pressure regulating valve by means of a pipe connection 22 which is adapted to be connected to the factory air line, for example. The pressure regulating valve, the pipes 14 and 18, and the tapered pipe 16 are all suitably mounted on a support or housing 23.

As shown in Fig. 1, a by-pass conduit 25 is connected across the opposite ends of the device which gauges the rate of flow of fluid, one end of the conduit 25 being connected to the T connection 19, and the opposite end being connected to a T connection 26 by means of which the pipe 14 is connected to the flexible tube 13. A control and shut-off valve 27 is provided in the by-pass conduit so that the rate of flow of fluid through the by-pass can be governed, as desired, and can be entirely prevented, by operating the manually controllable handle 28. When the hande 28 is in position to entirely close the by-pass conduit, all of the fluid coming through the tube 13 and the pipe 11 to the leakage nozzle or nozzles in the gauging element 10 will pass through the gauging tube 16, and as previously mentioned the position of the float 17 will be governed in accordance with the rate of flow. If the handle 28 is adjusted so that some flow can take place directly from the pressure regulating valve to the tube 13, the entire flow through the tube 13 will be made up of that which takes place through the by-pass conduit and the quantity flowing through the tapered gauging tube. Thus with any given condition of supply pressure under the control of the regulating valve, and any given condition of leakage in the gauging orifice of the gauging element, the height to which the float 17 rises will be dependent upon the amount of restriction present in the by-pass conduit 25, and the gauge may thus be adjusted to provide as high or as low a range of measurement as desired. If an extremely accurate measurement is required, and only a small tolerance is permitted in the size of the workpiece, the conduit 25 can be entirely closed so that all of the leakage air must travel through the tube 16, and control the position of the float 17. If, however, the parts to be checked vary widely in size, or if a rather large tolerance is permitted in the acceptable size of the parts, the valve 27 can be partly opened so that any desired portion of the flow that takes place through the leakage orifice of the gauging element comes through the tapered tube 16 and effects the float 17. The other portion comes through the by-pass conduit and does not effect the float. The operator can therefore position the handle 28, when the gauging element is inserted in a passage of the desired size, so that the float 17 will be about halfway between the upper and lower ends of the tube, under the desired supply pressure conditions. Then by inserting the gauging element in the workpiece to be gauged or compared with the standard size piece, the float 17 will not move all the way up to the top nor remain down at the bottom of the tube even though the diameter of the workpiece being gauged departs considerably from the known standard dimension. The graduations that may be provided on the housing at the side of the tube 16 may serve to give an accurate indication of the amount of oversize or undersize of the workpiece checked, as compared with the standard size desired, since the flow that takes place through the by-pass conduit is proportionate to that which takes place through the tapered gauging tube 16 for any setting of the valve 27.

The gauging element 10 as shown in Figs. 2 and 3 comprises a body portion 30, the embodiment of the invention shown being adapted to measure an internal diameter and consequently the body 30 having a cylindrical form with an outer diameter somewhat less than the diameter of the workpieces to be gauged. Inserted in longitudinally extending slots in the body portion is a series of hard, wear-resistant metal strips or bars 31, these bars projecting outwardly or radially from the outer surface of the body portion and being adapted to engage the cylindrical surface of the part to be checked and space the outer surface of the body portion away from the surface of the workpiece. As shown in Figs. 1 to 3 the strips 31 are arranged parallel to the axis of the body portion. The strips are preferably inserted in slots in the body portion and held securely and rigidly in place as by means of brazing or because of the tightness of the fit. After they are secured in position the outer surfaces of the strips 31 are ground to provide cylindrically curved outer surfaces defining a diameter that is very slightly less than the diameter of the workpiece surface to be gauged.

The body portion 30 is provided with a fluid passage 33 in closed communication with the pipe 11. Fixed in the body portion are two nozzle inserts 34, arranged preferably diametrically opposite one another, each of these inserts being arranged closely adjacent to and between a pair of aligned strips 31. The outer surface of each of these nozzles lies slightly below the level of the outer surface of the strips 31, so that even if the strips should fit very closely into the workpiece, there would be some substantial distance between the outer surface of the nozzle and the work surface to be gauged, perphaps one thousandth of an inch or so. Each of these inserts is in the form of a barrel 36 adapted to be pressed into and fitted tightly within the fluid passage 33. Projecting outwardly of the barrel is a flange 37 which rests on a flat surface 38 machined on the body portion 30. The outer or terminal end of the nozzle insert, as will be apparent from Figs. 4 and 5, provides a cylindrically curved surface 39 which is accurately ground concentric to the longitudinal axis of the body portion so that all parts of the surface 39 will have an equal spacing from the surface of the workpiece to be gauged, and an even leakage flow will take place in all directions radially of the axis of the barrel portion 36. In order to provide a somewhat less abrupt change of direction of air flow from the passage through the barrel 36 and then between the accurately ground surface 39 and the surface of the workpiece itself, and to increase the accuracy of the gauging device, the very end of the axial passage through the barrel 36 is slightly chamfered or flared as indicated at 40.

The strips 31 are preferably made of a metal that is highly wear-resistant and very hard, as compared to the corresponding characteristics of the body portion 30. The strips 31 are preferably made of tungsten carbide and the body portion 30 made of suitable steel.

Regardless of whether the strips 31 fit rather tightly in the workpiece to be gauged or whether there is a considerable clearance between these strips and the workpiece, the ends of the nozzle 34 will be spaced some substantial distance from the workpiece surface. If the gauging element 10 is so positioned in the workpiece that one of the nozzle inserts 34 is lowermost, the end of that nozzle will not be closed entirely by the workpiece surface and the flow of air taking place through both of the opposed nozzles will be substantially the same as if both nozzles were exactly the same distance from the workpiece surface. Errors or variations in indications produced are thus avoided, and the gauging indications obtained by measuring the level of the float 17 will be extremely accurate and reliable.

In the form of construction illustrated in Figs. 6 to 9 inclusive, the gauging element is one adapted for use in measuring an internal diametrical measurement of a rifled barrel. The gauging element, as shown in these figures, comprises a body portion 42 supported by a long pipe 43 having a shut-off valve 41 which in turn is connected to a rate of flow measuring device such as that previously described. The body portion 42 is provided with a fluid passage 43 communicating with a pair of diametrically opposed nozzle inserts 44 and 45 which are similar in construction to the nozzle inserts 34.

Rotatably mounted on the body portion 42 at each side of its central transverse plane is a sleeve 46 fitting against a shoulder 47 and held against axial displacement by means of a washer 48 and an end cap 49 at one end of the body portion, an end cap 50 being threaded in the other end of the body portion to retain the other sleeve 46. The end cap 49 is threaded on the pipe 43 and clamps against the washer 48 to prevent rotation of the washer. The washer is so spaced from the shoulder 47 as to permit free rotation of the sleeve 46, but limits the rotational movements of the sleeve by means of an axial projection 50' on the washer engaging a notch or groove 51 larger than the width of the projection and provided in the end of the sleeve 46, the difference between the circumferential length of the slot and the width of the projection 50' determining the amount of rotation permitted the sleeve 46. Rotation of the other sleeve 46 is similarly limited.

Fixed on each sleeve 46 is a series of wear-resistant, hard metal inserts 53, annularly spaced around the axis of the body portion, the outer surfaces of these inserts 53 being cylindrically ground to an exact size just slightly smaller than the size of the passage in the workpiece they are to gauge. As shown, each sleeve 46 is provided with four of these inserts 53, each being in the form of a short radially extending cylinder having a diameter slightly less than the width of the rifling groove in the barrel to be checked. The outer portions of the inserts enter the rifling grooves, while the outer surface of the sleeve 46 operates with suitable clearance along the smaller diameter of the barrel. The two series of hardened inserts 53 are arranged at opposite sides of the two nozzle inserts thus affording a measure of protection for the outer accurately formed cylindrically ground surfaces 54 of these nozzles, it being understood that the outer surfaces of these inserts 53 define a cylinder which is slightly larger in diameter than the cylinder containing the outer surface of the nozzle inserts 44 and 45. A pair of adjacent inserts 53 will operate along the same rifling groove as the nozzle 44 or 45 which is located between them, and the relative rotational movements permitted the two sleeves 46 allow the pins 53 to adjust themselves in accordance with the helix angle of the rifling groove. If the helix angle varies along the barrel, relative rotational movement of the two sleeves 46 takes place as the gauging element is moved along the rifled barrel. The gauging element is therefore adapted to measure the depth or maximum diameter of a pair of opposed rifling grooves of any constant helix angle or of a variable helix angle, and it of course can be used to measure a straight groove or key way which is parallel to the axis of the part gauged. In the latter case a pair of inserts 53 will arrange themselves parallel to the axis of the gauging element, with the adjacent insert nozzle between them. In order to center a nozzle insert in a rifling groove and keep the sides of these nozzles from rubbing on the sides of the groove, the body portion 42 is provided with hard wear-resistant inserts 56 positioned to enter another rifling groove of the barrel and turn the body portion as the element is moved along the barrel being checked.

The modification of the invention shown in Figs. 10 and 11 is one in which the depth of a rifling groove can be gauged where the helix angle of the rifling is constant. In this form of the invention the body portion 60 is provided with a pair of nozzle inserts 61 similar in construction to the nozzle inserts previously described. The hardened carboloy inserts provided in the steel body portion are here in the form of round pins arranged in a series 63, a second series 64 and an intermediate series 66, the inserts being fixed or brazed in the body portion so as to have a fixed relationship with respect to the nozzle inserts, but one in which there is a desired helical arrangement of a pin 63, a nozzle 61 and an insert 64. The body portion 60 is carried by pipe 65 which is connected to a rate of flow measuring device such as has been previously described.

As will now be apparent, the gauging element used in conjunction with the rate of flow measuring device is one adapted for very long periods of usage before any noticeable wear takes place on the very hard inserts which sustain all frictional contact with the work, and over this extended period of usage there will be no rubbing or wear on the accurately formed outer surfaces of the nozzles which cooperate with the workpiece surface in forming the leakage path. The nozzles themselves may be made inexpensively in quantities, as they are separate inserts mounted in the body portion of the gauging element and construction of the nozzle inserts is such that they may be readily applied to the gauging element and then accurately ground to provide the desired cylindrical curvature so that the flow over the accurately formed outer or terminal surfaces of the nozzles will be even and distributed. The relative arrangement of the nozzles with respect to the hard insert bars or pins is such that the nozzles will be protected against injury while the gauging element is being handled on the bench. This is especially true in the modification shown in Figs. 1 to 3 where each nozzle is arranged closely adjacent to and directly between the ends of a pair of elongated bars or strips of the hard material. The several features mentioned provide for greater reliability in the indications produced in a gauging operation and avoid the necessity of using undue care in accurately applying the gauging element to the workpiece. With the by-pass and its control for the rate of flow indicator, the gauging device will be readily adaptable to widely varying conditions.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Gauging apparatus for comparing the size of a workpiece with a standard, comprising a body portion having a fluid passage adapted for connection to fluid supply and fluid measuring means, a series of work engaging projections on said body portion, said projections having superior hardness and wear-resistant qualities compared to the body portion and arranged to space the body portion from the workpiece, a nozzle insert fixed in said body portion and in communication with said fluid passage, said nozzle terminating at its outer end in a surface which is of arcuate curvature concentric with the body portion and which extends annularly around the nozzle opening, said surface being located by the said projections in slightly spaced relation from the workpiece.

2. In a gauging device for measuring fluid flow through a leakage path, in combination, a body portion having a fluid passage, metal projections carried by said body portion and having superior hardness and wear-resistant qualities as compared to said body portion, said projections being annularly spaced on the body member and adapted for interfitting association with a workpiece and spacing the workpiece from the body member, a plurality of diametrically opposed nozzle inserts fixed in said body member in communication with said fluid passage and arranged in alignment in a direction axially of the body member with a plurality of said projections for protection thereby, each of said inserts terminating in a cylindrically curved gauging surface concentric with said body portion and located by said projections in slightly spaced relation from the workpiece to insure a substantial leakage path between the workpiece and the nozzle inserts.

3. In a gauging device for measuring fluid flow through a leakage path, in combination, a body portion having a fluid passage, metal projections carried by said body portion and having superior hardness and wear-resistant qualities as compared to said body portion, said projections being annularly spaced on the body member and adapted for interfitting association with a workpiece and spacing the workpiece from the body member, a nozzle insert fixed in said body member in communication with said fluid passage and terminating in a cylindrically curved gauging surface concentric with said body portion and located by said projections in uniformly spaced relation from the workpiece, two of said projections being located at opposite sides of said nozzle insert in substantial alignment therewith in a direction axially of the body portion.

4. Gauging apparatus for comparing the size of a cylindrically curved workpiece surface with a standard, comprising a generally cylindrical body portion having a fluid passage adapted for connection to fluid supply and fluid measuring means, a series of work engaging bars fixed on said body portion and extending axially of the body portion and annularly spaced thereon, said bars having superior hardness and wear-resistant qualities compared to the body portion and arranged to space the body portion from the workpiece surface, a pair of diametrically opposed nozzles each fixed in said body portion in line with a plurality of said bars and closely adjacent the ends thereof and in communication with said fluid passage, each nozzle terminating at its outer end in a cylindrically curved surface extending annularly around the nozzle opening and located by the said bars in uniformly spaced relation from the workpiece surface.

5. Gauging apparatus for comparing the size of a workpiece with a standard, comprising a generally cylindrical body portion having a fluid passage adapted for connection to fluid supply and fluid measuring means, a series of work engaging projections on said body portion, said projections having superior hardness and wear-resistant qualities compared to the body portion and arranged to space the body portion from the workpiece, a nozzle insert fixed in said body portion and in communication with said fluid passage, said insert having a flange arranged in abutting relation to a flat surface on the body portion and said nozzle terminating at its outer end in a surface extending annularly around the nozzle opening and located by the said projections in slightly spaced relation from the work-piece, said surface and said projections having cylindrically curved surfaces concentric with the body portion.

6. Gauging apparatus for comparing the size of a workpiece with a standard, comprising a generally cylindrical body portion having a fluid passage adapted for connection to fluid supply and fluid measuring means, a series of work engaging projections on said body portion, a pair of diametrically opposed nozzles in said body portion and in communication with said fluid passage, said nozzles each terminating at its outer end in a surface extending annularly around the nozzle opening and located by the said projections in slightly spaced relation from the workpiece, said surfaces and said projections having cylindrically curved surfaces concentric with the body portion, the passages through the nozzles being outwardly flared to merge into the said surfaces.

7. Gauging apparatus for comparing the size of a workpiece with a standard, comprising a body portion having a fluid passage adapted for connection to fluid supply and fluid measuring means, a series of work engaging pins on said body portion, said pins having superior hardness and wear-resistant qualities compared to the body portion and arranged to space the body portion from the workpiece, a flanged nozzle insert fixed in said body portion and in communication with said fluid passage, the flange of the nozzle insert in abutting relation to a flat surface on the body portion, said nozzle terminating at its outer end in a cylindrically curved surface concentric with the body portion and located by the said projections in slightly spaced relation from the workpiece.

8. Gauging apparatus for comparing the size of a workpiece with a standard, comprising a body portion having a fluid passage adapted for connection to fluid supply and fluid measuring means, a sleeve mounted on said body portion for free rotation thereon in a gauging operation and having a series of work engaging projections arranged to space the body portion and sleeve from the workpiece, a series of work engaging projections arranged on the body portion and cooperating with the projections on the sleeve to cause relative rotation of the sleeve and body portion, a nozzle fixed in said body portion and in communication with said fluid passage, said nozzle terminating at its outer end in a surface located by the said projections in slightly spaced relation from the workpiece.

9. Gauging apparatus for comparing the size of a workpiece with a standard, comprising a body portion having a fluid passage adapted for connection to fluid supply and fluid measuring means, a sleeve rotatably mounted on said body portion and having a series of work engaging projections arranged to space the body portion and sleeve from the workpiece, a nozzle fixed in said body portion and in communication with said fluid passage, said nozzle terminating at its outer end in a surface located by the said projections in slightly spaced relation from the workpiece and at least one projection fixed on said body portion in predetermined relation to said nozzle, said projections arranged to accommodate themselves to a rifling groove of changing helix.

10. Gauging apparatus for comparing the size of a workpiece with a standard, comprising a body portion having a fluid passage adapted for connection to fluid supply and fluid measuring means, a pair of sleeves rotatably mounted on said body portion and having a series of work engaging radial pins arranged to space the body portion and sleeves from the workpiece, a nozzle fixed in said body portion between said sleeves and in communication with said fluid passage, said nozzle terminating at its outer end in a surface located by the said pins in slightly spaced relation from the workpiece and a radial pin fixed on said body portion in predetermined relation to said nozzle to locate said nozzle in a rifling groove of the workpiece.

11. A gauging device for comparing a diametrical dimension of a workpiece with a size standard comprising, in combination a body member, adapted for interfitting association with a workpiece and having a nozzle located by said body member slightly spaced from the work surface gauged, a conduit adapted for connection to a fluid pressure source and communication with said nozzle, said conduit having means for determining the rate of flow of fluid therethrough, and a pressure tight by-pass conduit around said means and having an adjustable flow restricting member operable to control the flow of fluid through the by-pass conduit.

12. A gauging device comprising a gauging element adapted for interfitting engagement with a workpiece, said gauging element having a fluid passage terminating in a nozzle cooperating with the surface gauged to provide a leakage path the effective size of which is determined by the workpiece, a conduit for supplying fluid under pressure to said nozzle, means for gauging the rate of flow of fluid through said conduit, said fluid passage providing the sole outlet of fluid passing through said conduit, and means for changing the rate of flow of fluid through the passage in the gauging element with respect to the rate through said gauging means.

13. A gauging device comprising a gauging element adapted for interfitting engagement with a workpiece, said gauging element having a fluid passage terminating in a nozzle cooperating with the surface gauged to provide a leakage path the effective size of which is determined by the workpiece, a rate of flow indicator, means adapted for connection to a fluid pressure source to supply fluid under pressure to said indicator and through said indicator to said fluid passage in the gauging element, means placing the indicator in communication with said nozzle, a pressure tight by-pass around the indicator, and an adjustable restriction in said by-pass.

14. A gauging device comprising a gauging element adapted for interfitting engagement with a workpiece, said gauging element having a fluid passage terminating in a nozzle cooperating with a gauged surface to provide a leakage path the effective size of which is determined by the workpiece, an adjustable pressure regulator, a conduit for supplying fluid under pressure from said regulator to said fluid passage, said fluid passage providing the sole outlet of fluid from the pressure regulator, said conduit having means for determining the rate of flow of fluid therethrough, and a pressure tight by-pass connected around said determining means and having an adjustable flow restricting means operable to control and interrupt the flow of fluid through said by-pass conduit.

WILLIS FAY ALLER.